Oct. 16, 1962   W. J. HARPER ETAL   3,058,604
ARTICLE TREATING MACHINE AND LOAD-UNLOAD MECHANISM THEREFOR
Filed Oct. 22, 1959   9 Sheets-Sheet 1

INVENTORS
C. E. Bagwell
W. J. Harper &
P. A. Hauck
BY *Wilkinson, Mawhinney & Thibault*
ATTORNEYS

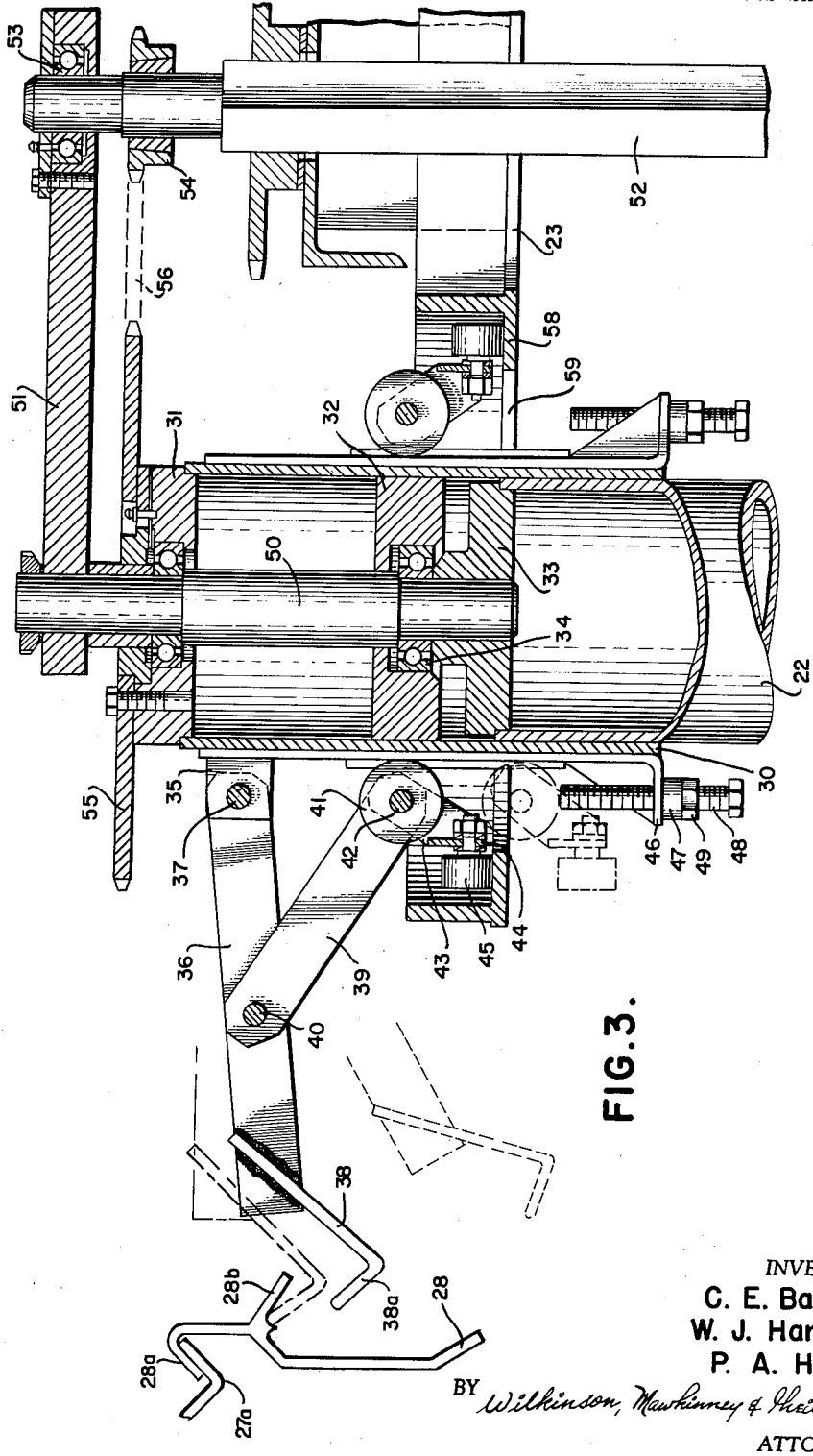

Oct. 16, 1962 W. J. HARPER ETAL 3,058,604
ARTICLE TREATING MACHINE AND LOAD-UNLOAD MECHANISM THEREFOR
Filed Oct. 22, 1959 9 Sheets-Sheet 4
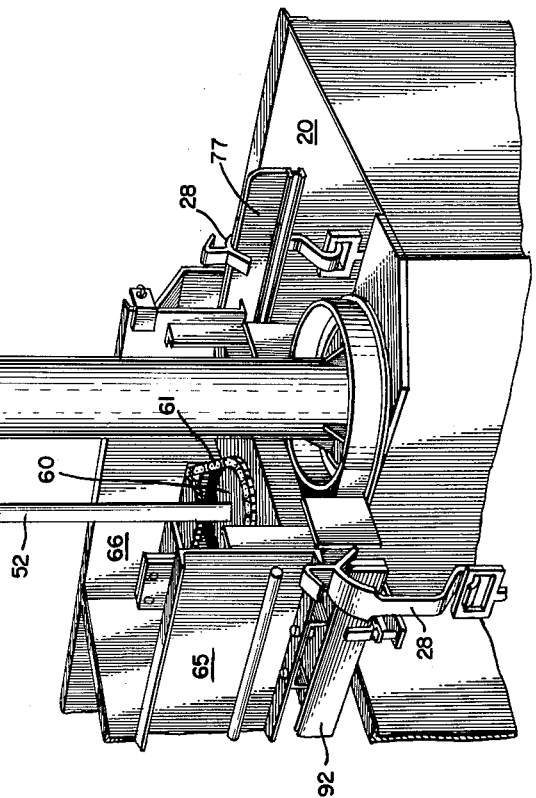
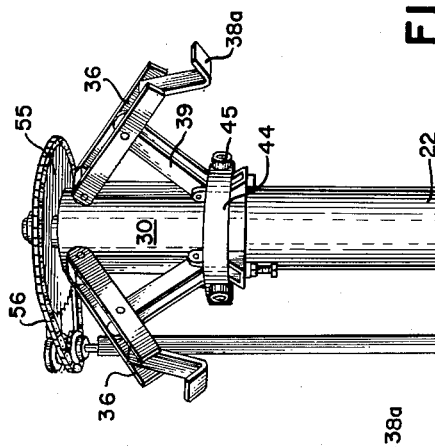
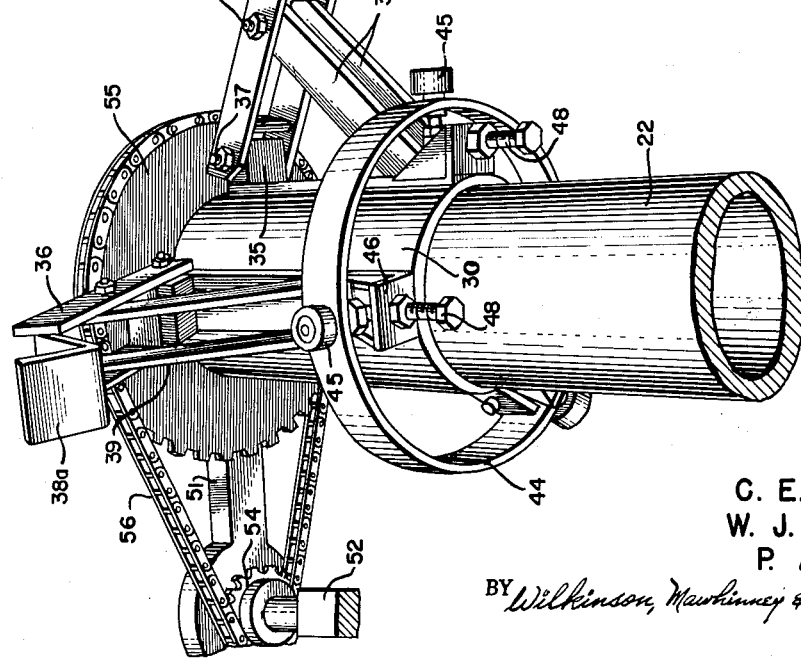
INVENTORS
C. E. Bagwell
W. J. Harper &
P. A. Hauck
BY *Wilkinson, Mawhinney & Theibault*
ATTORNEYS

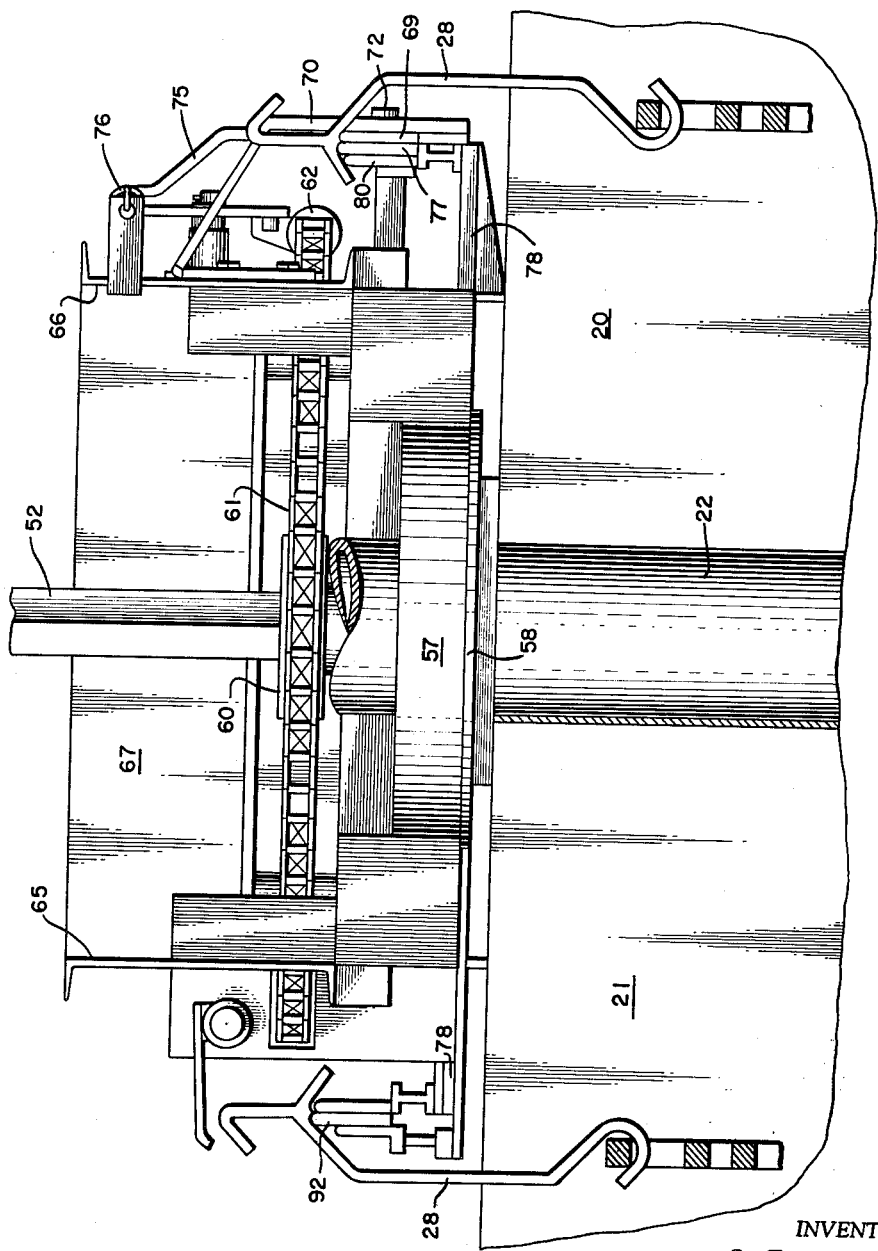

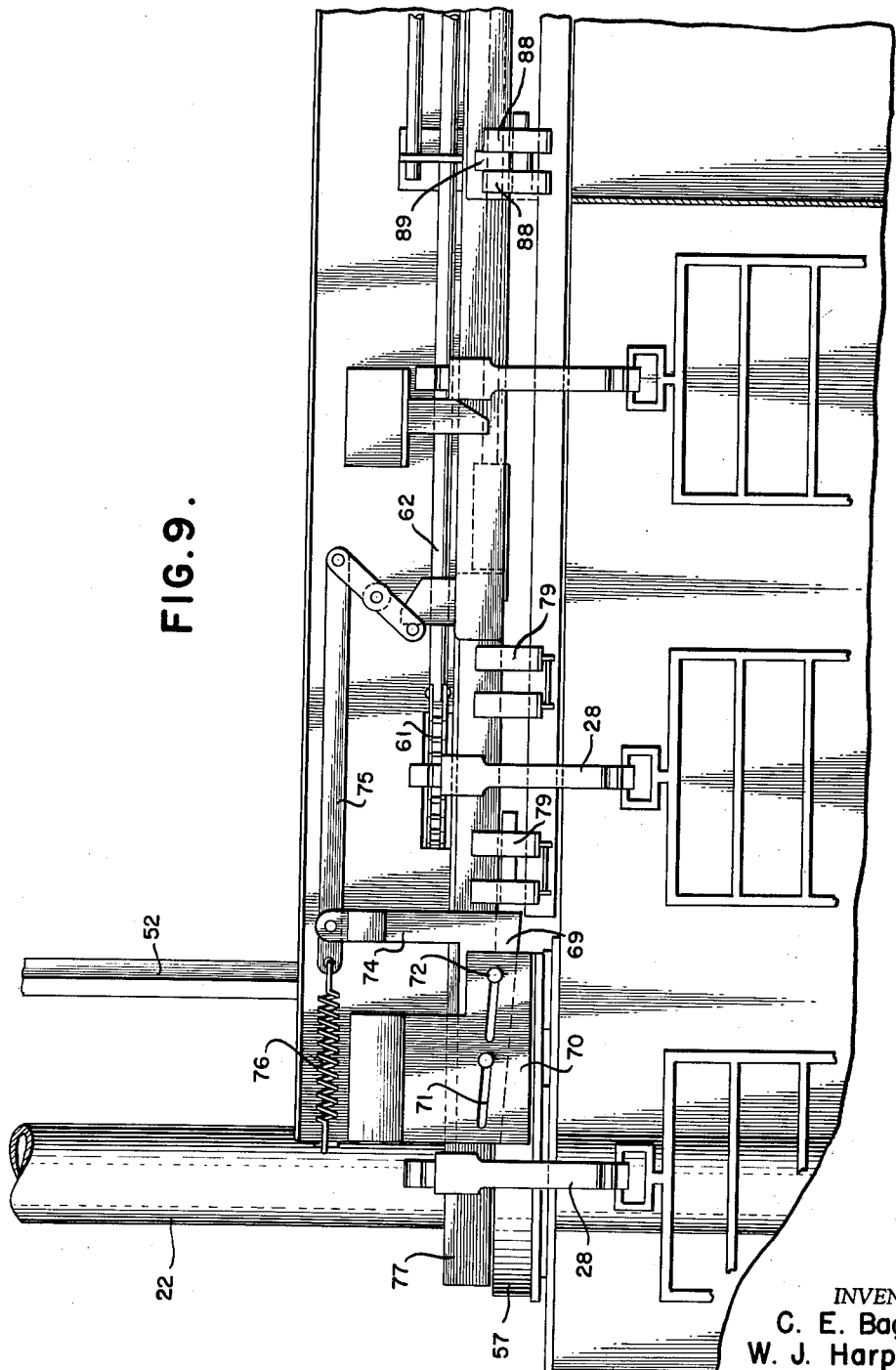

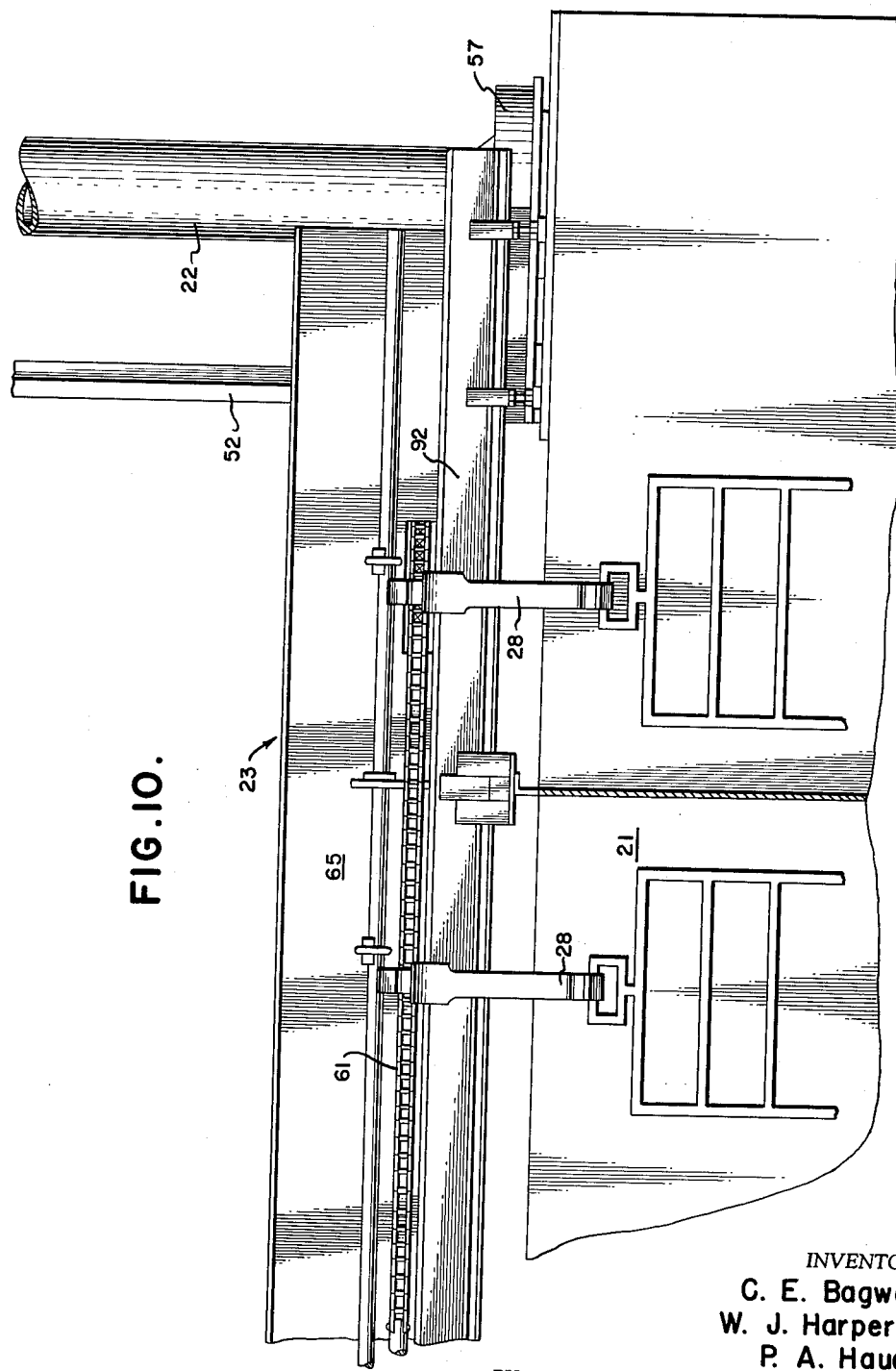

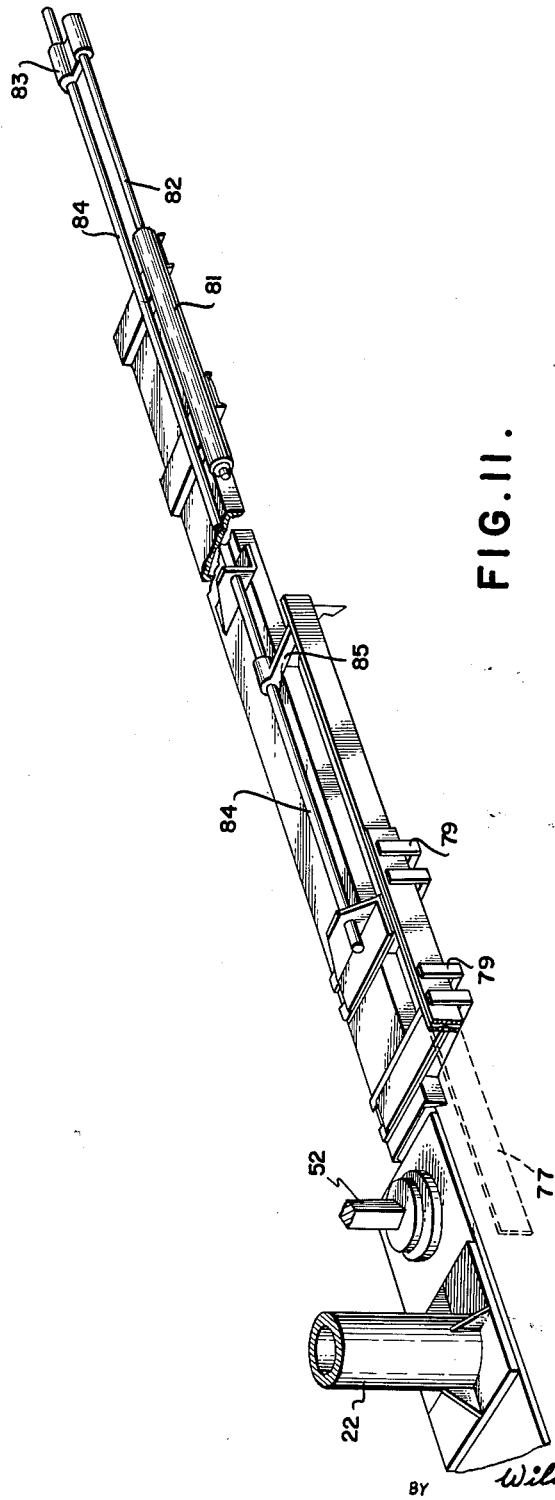

3,058,604
ARTICLE TREATING MACHINE AND LOAD-UNLOAD MECHANISM THEREFOR

Willard J. Harper, Middletown, Charles E. Bagwell, Red Bank, and Paul A. Hauck, Union, N.J., assignors to Hanson-Van Winkle-Munning Co., Matawan, N.J., a corporation of New Jersey
Filed Oct. 22, 1959, Ser. No. 848,145
15 Claims. (Cl. 214—89)

The present invention relates to an article treating machine and load-unload mechanism therefor and more particularly to that type of apparatus in which the work to be treated is placed on racks which are fed to and taken away from the machine by a monorail feed device in which the racks are hung upon work carrying hangers which engage and are carried by hooks which roll along a monorail structure and which are spaced at equal distances and are interconnected to be moved at fixed distances of travel along the monorail and which machine will take one work rack from the monorail and introduce it to the treatment line while simultaneously depositing back on the vacated station of the monorail a rack carrying treated work from the discharge end of the machine. In short this type of mechanism leaves no gaps in the monorail feed device since the monorail approaching a point of tangency with the load-unload end of the machine contains untreated work and the monorail passing from its point of tangency with the machine will carry treated work.

Another object of the present invention is to provide an apparatus of the character described in which the loading and unloading of the machine is kept in automatic stepped sequence with the operation of the machine and is synchronized particularly with the up and down movement of the elevator of the machine, not requiring human labor to load and unload the machine.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 3 is a fragmentary longitudinal section with parts broken away and parts shown in section taken at a magnified scale showing the load-unload actuation portion of the machine.

FIGURE 4 is a bottom perspective view with parts broken away and parts shown in section taken at a magnified scale showing the load-unload mechanism.

FIGURE 5 is a fragmentary perspective view of the load-unload station of the work treatment machine of the present invention with the elevator in the lowered position.

FIGURE 8 is a fragmentary transverse section taken through the treatment tank area of the work treatment machine of the present invention having parts broken away and parts shown in section with the elevator in the lowered position.

FIGURE 9 is a fragmentary side elevational view with parts broken away and parts shown in section of the load and first treatment station of the machine of the present invention with the elevator in the lowered position.

FIGURE 10 is a view similar to FIGURE 9 taken at the unload station of the machine, and FIGURE 11 is a fragmentary perspective view of the work carrier actuating means of the treatment machine showing the prime mover and having parts broken away and parts shown in section.

Figure 1:
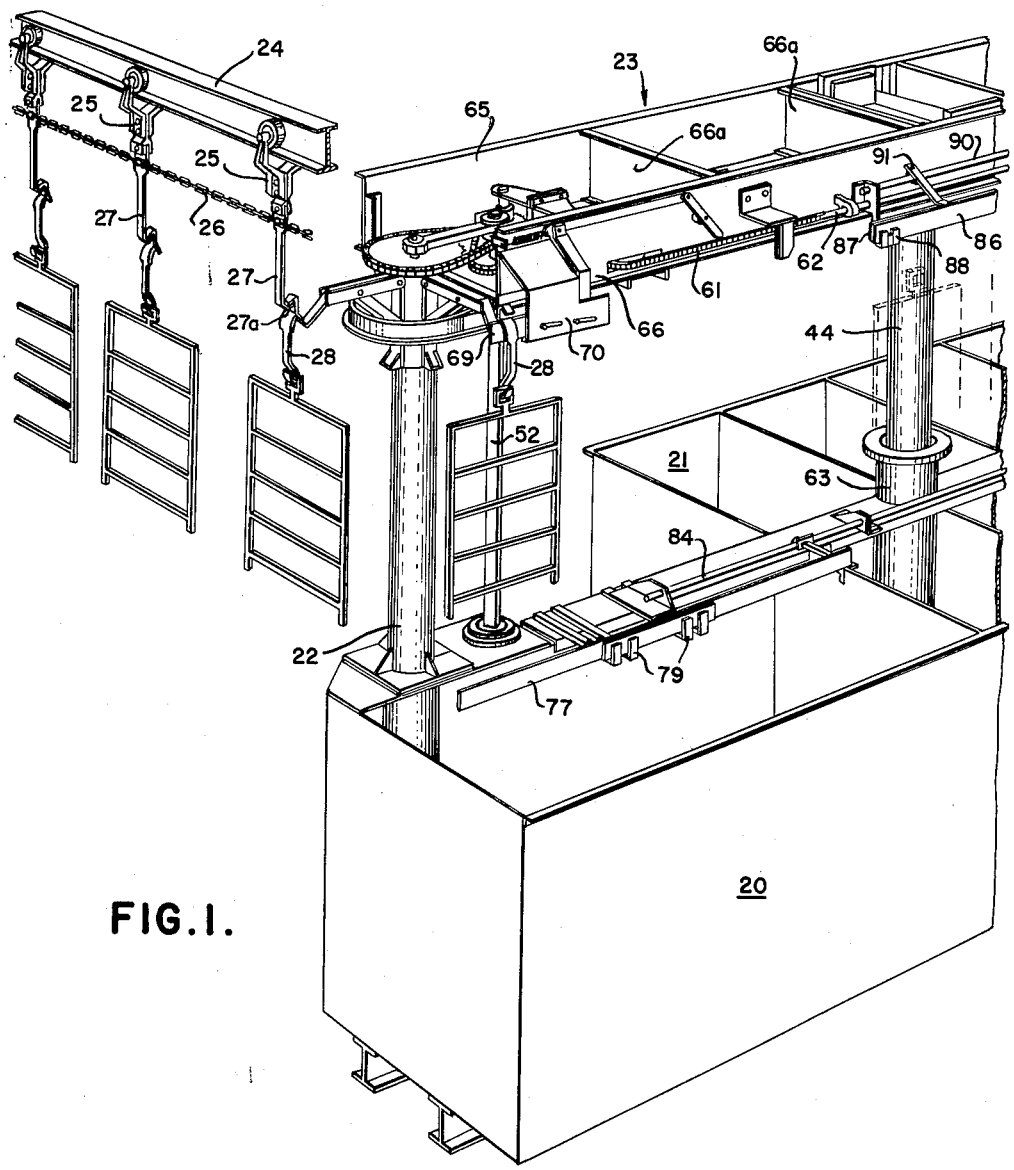
FIGURE 1 is a fragmentary perspective view with parts broken away and parts shown in section of the load-unload portion of the machine and the relative positioning thereto of the monorail feed device, with the elevator in the up position and the load-unload mechanism having just completed a cycle of transfer between the machine and the monorail.
Figure 2:
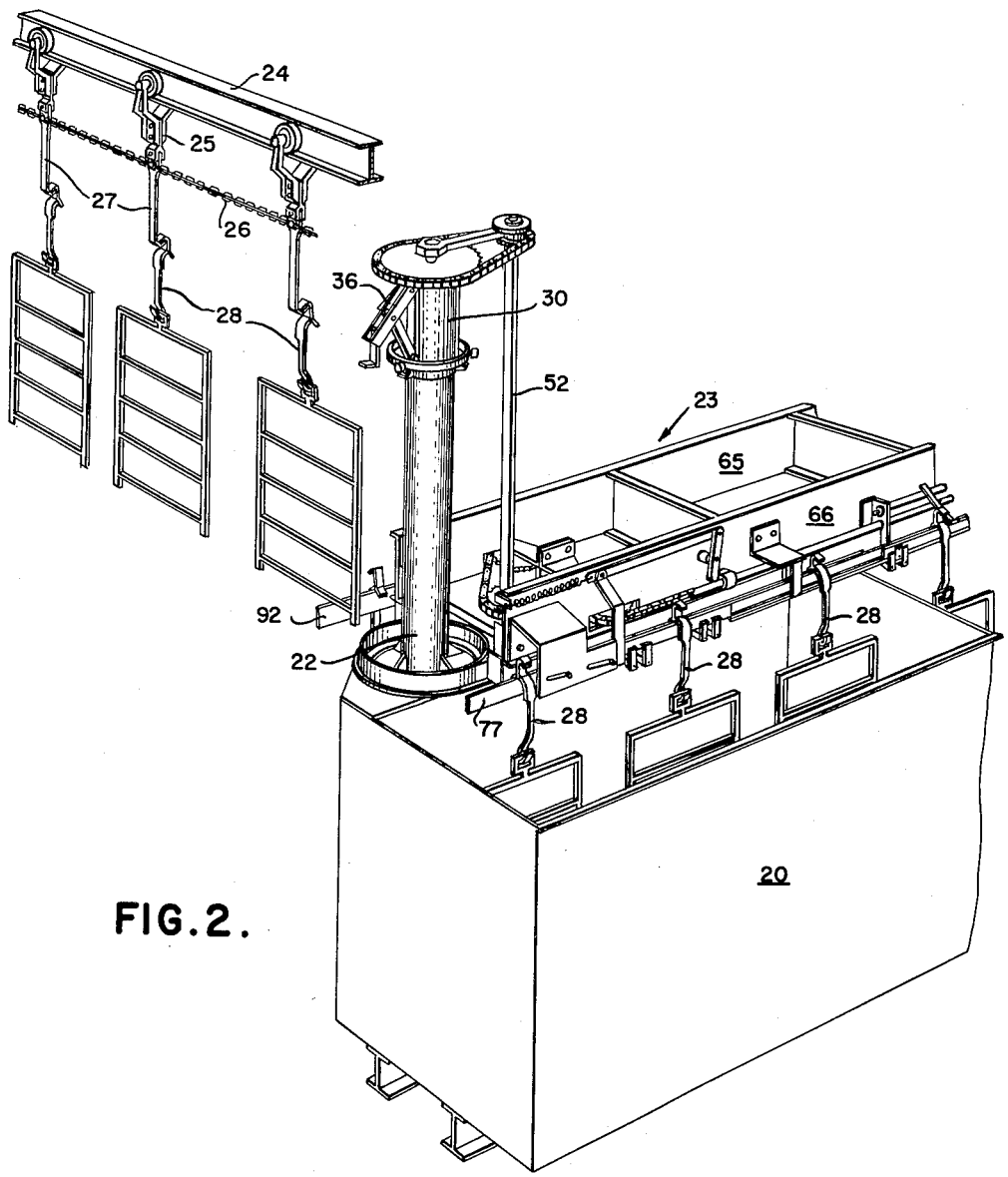
FIGURE 2 is a view similar to FIGURE 1 with the elevator in the lowered position and the work racks carried by the machine lowered in the treatment tanks.

Referring more particularly to the drawings and for the moment to FIGURES 1 through 3 inclusive, the initial treatment tank or station of the machine is shown at 20 and the final treatment tank of the machine at 21. It will be noted that there is a vacant spot on the discharge or final treatment side of the machine between the tank 21 and the end of the machine. This is referred to as the "unload" station.

Load-Unload Mechanism

A mast 22 carries the load-unload mechanism and an elevator 23 is positioned centrally of the machine and its lines of treatment tanks, one side of the machine being pre-treatment and the other side being post-treatment. A monorail device 24 runs substantially at right angles and is tangent to the longitudinal axis of the machine. This monorail device carries roller carriages 25 which are maintained at spaced intervals along the monorail by drive chains 26. Depending from the carriages 25 are work hanger hooks 27 having upturned ends 27$^a$. Cooperating with the upturned ends 27$^a$ of the hooks 27 are work hangers 28 which have complemental hooks 28$^a$ for riding upon the upturned ends 27$^a$ of the hanger hooks 27.

Work racks 29 which carry the work to be treated and the work treated are hung on these work hangers 28.

Referring now to FIGURE 3 particularly, the mast 22 at its upper portion has an outer tubular sleeve 30 thereon which sleeve is secured to a cap 31. The sleeve 30 is maintained in its position at the top of the mast 22 by complemental support members, one of which 32 is welded or otherwise secured to the tubular member 30 and the other, a mast cap support member 33, is secured to the mast 22. Between the members 32 and 33 is a roller bearing assembly 34 which permits the sleeve member 30 to rotate about the mast 22. The sleeve member 30 has projections or lugs 35 extending radially therefrom.

Pivoted to the lugs 35 are work transfer arms 36 which are pivoted at their inner ends at 37 to the lugs 35 and which carry at their outer ends a work hanger engaging hook 38 having an upturned end 38$^a$.

This upturned end 38$^a$ cooperates with a downturned end 28$^b$ of the work hangers 28. An operating lever 39 is connected to the work carrying arms 36 by a pivot 40 at the outer end of the levers 39. The other end of the levers 39 carries rotatably thereon rollers 41, rotatably mounted on a shaft 42. Carried by the shaft 42 are arms 43 which have secured at their outer end a ring or collar 44. Secured at substantially a right angle to the collar 44 are rollers 45 which are mounted for free rotation relative to the collar 44. The lower portion of the tubular member 30 is provided with a bracket or support member 46 having a threaded boss 47 through which passes a threaded limit bolt 48 and which assembly is provided with a locking nut 49. The bolt 48 may be set to determine the lowermost position of the rollers 41, for instance, as shown in dotted lines in FIGURE 3 when the elevator structure 23 is lowered from the upper position shown in solid line in FIGURE 3.

The sleeve member 30 also carries a guide shaft 50 which is journalled at one end in the member 33 and at its other end by a spacer member 51. This spacer member 51 ties the rotary sleeve 30 with a square operating shaft 52. The connection between the spacer member 51 and the square operating shaft 52 is a roller bearing assembly 53. Secured to the shaft 52 for rotation therewith is a drive sprocket 54 which is aligned with a driven sprocket 55 which is secured to rotate the rotary sleeve assembly 30. When the shaft 52 is rotated the sprocket 54 will impart rotary motion to the sprocket 55 through a chain drive 56.

Figure 6:
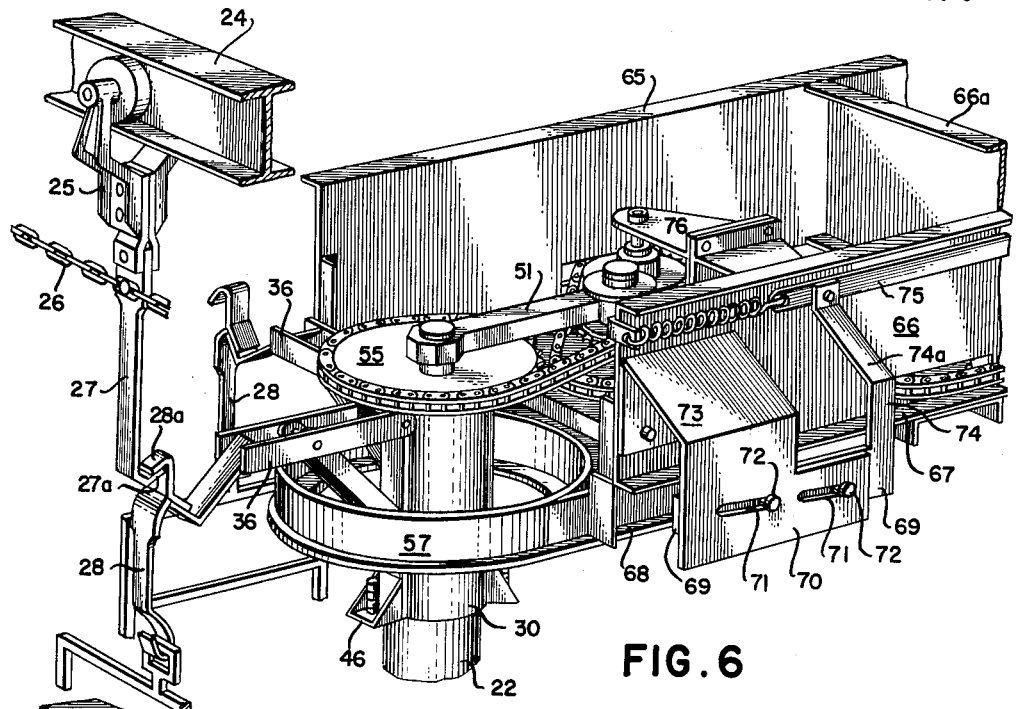
FIGURE 6 is a fragmentary perspective view of the load-unload station of the machine of the present invention with the elevator in the raised position and ready to commence the transfer of the load-unload cycle.
Figure 7:
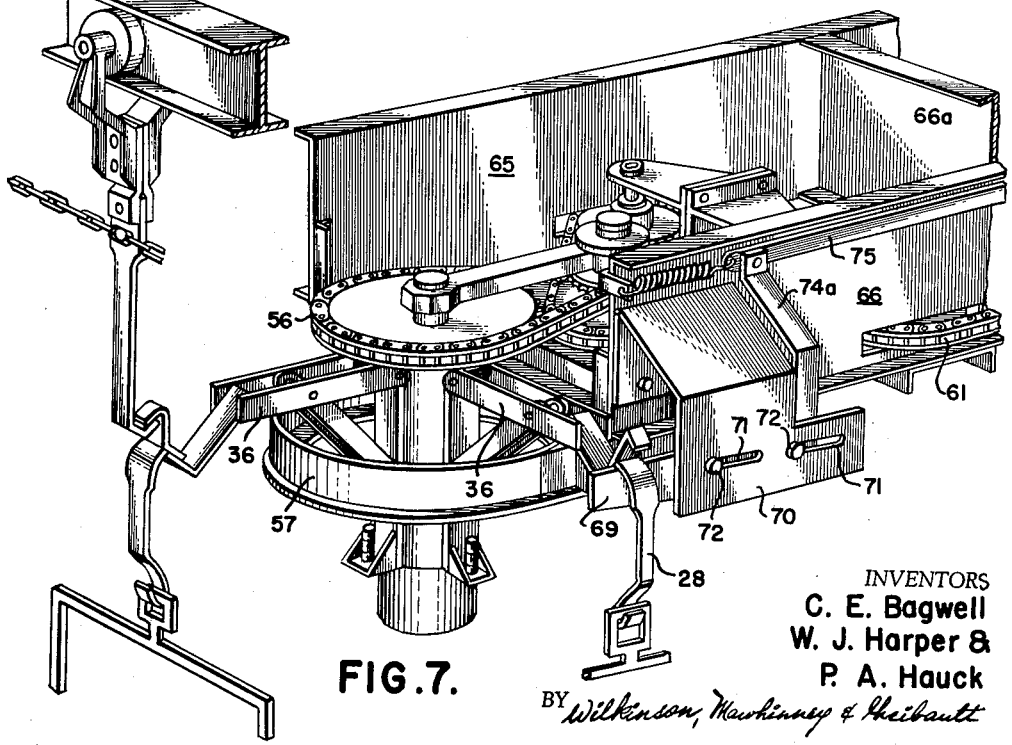
FIGURE 7 is a view similar to FIGURE 6 in which the load-unload mechanism has completed transfer of work from the monorail to the machine and has deposited work from the machine onto the monorail.

Rotation of the sprockets 54, 55 cause the work carrying arms 36 to rotate from the position shown in FIGURE 6 to that shown in FIGURE 7. This is substantially a 90° arc of rotation. The elevator structure 23 carries an outer ring assembly 57 which has a base track 58 which is positioned to engage beneath the rollers 45 and to elevate the rollers 45 thereby raising the arms 36 from the dotted line position shown in FIGURE 3 upwardly, the solid line of FIGURE 3 being just short of the pick-up point where the arms 36 through the hook 38 engage the work carrying hangers 28 to remove work from the monorail. The track 58 has an inner open portion 59 of sufficient diameter to clear the support members 46 carried by the rotary sleeve 30 so that the elevator assembly 23 can be lowered away from the mast and its upper rotary assembly as best seen in FIGURE 5. There are two sets of work transfer arms 36 carried by the rotary assembly 30 as best seen in FIGURES 4 and 5 and it will be noted that these work carrying arms are secured to the rotary assembly at a substantially 90° displacement with respect to each other. This constitutes generally the transfer assembly mechanism.

However, the drive mechanism for compelling 90° rotary motion of the square shaft 52 comprises a sprocket 60 having a square opening therethrough to permit the sprocket 60 to ride up and down along the shaft 52. The sprocket is rotated by a chain 61 best shown in FIGURES 1 and 5. The chain 61 is connected to a rod 62 which receives a straight-line reciprocating motion from a hydraulic or pneumatic cylinder (not shown). When the operating means either hydraulic or pneumatic reciprocates the rod 62, the entrained chain 61 compels rotation of the sprocket 60 and hence the square shaft 52 rotates thereby rotating sprocket 54 through chain 56 and sprocket 55 to rotate the work carrying arms 36 through 90° of rotary travel about the mast 22.

*The Elevator Mechanism*

The elevator structure designated by the general reference numeral 23 is elevated and lowered by a hydraulic cylinder and ram mechanism wherein a cylinder 63 operates a ram 64 for raising and lowering the elevator structure. The elevator structure 23 comprises a pair of spaced apart large web channel members 65 and 66. The web channel members 65 and 66 are maintained in rigid position by means of spacer members 66ª welded or otherwise secured thereto. This is best seen in FIGURE 1.

At the load-unload end of the elevator mechanism 23 the channel member 66 is provided with base plates 67 and 68. A work carrying engaging rail 69 is carried by a guide plate 70 having inclined slots 71 therein acting as guides for pins 72 which are secured to the work engaging rail 69. The plate 70 is displaced from the channel member 66 by a spacer portion 73 the other end of which is secured to the channel member. The rear portion of the work engaging rail is provided with an upstanding actuating arm 74 having a portion 74ª which is secured to a reciprocating rod or bar 75 for imparting reciprocating motion to the work engaging rail 69. The bar 75 and rail 69 are normally biased to the position of FIGURE 7 under the influence of a spring 76, one end of which is secured to the web or channel member 66 and the other end of which is secured to the rod 75. The inclined slots 71 cooperate with the pins 72 to impart an upward lift to the work engaging rail 69 whereby the work engaging rail 69 will come beneath the hook 28ᵇ on the work hanger 28 to lift the work hanger 28 from engagement with the hook 38ª carried by the free ends of the work transfer arms. The bar 75 is reciprocated when the elevator is in the fully up or fully down position. It is moved to the position of FIGURE 7 when the elevator is in its fully up position so that work may be taken from the work carrying arms and transferred to the elevator structure. When the elevator structure 23 is lowered to the position shown in FIGURE 2, the bar 75 is then driven in a direction to the right-hand side of FIGURES 6 and 7. This will be noted in FIGURE 2 wherein the spring 76 has been distended from that shown in FIGURE 7. At this time the work engaging rail 69 moves to the right and the pins 72 travel in the inclined slots to their lowermost position of the inclined walls. This deposits the work hanger 28 upon a fixed down rail 77, which rail is mounted on the static frame of the treatment machine just above the tank top 20. The rail 77 does not go up and down with the elevator, but remains in this fixed down position. The rail 77 may be reciprocated to advance the work from one station to another within the treatment tank 20.

Referring now to FIGURES 1, 2 and 9, when the elevator is raised to its fully up position as shown in FIGURE 1, reciprocation of the chain 61 and rod 62 through the link 75 will cause the work carrying rail 69 to be moved to the left and to protrude or extend beyond the plate 70 as shown in FIGURE 1. When this has taken place the work from the monorail can be transferred over to and the work hangers placed upon the rail 69. It will be noted that in this position the pins 72 in the inclined slots 71 of plate 70 have been transferred to their uppermost position and that therefore the rail 69 will be horizontally beside the rail 77 when the elevator is subsequently lowered. When the elevator is lowered the rail 69 comes into adjacent placement with the rail 77 as best seen in FIGURE 8 and upon reverse movement of the rod 62, chain 61 and rail 69 it will be noted that the rail 69 is shifted to the position of FIGURE 9 in which the pins 72 have travelled to the lower position of their slots and the work carrying rail 69 has travelled within the plate 70. This in effect transfers the work hanger 28 onto the rail 77. When the elevator is then raised to the position of FIGURE 1 the rail 77 is reciprocated or advanced to the right of FIGURES 1 and 9 and the work deposited on rail 77 is then advanced from the station shown at the extreme left of FIGURE 9 to the next station and all work is accordingly advanced to the right of FIGURE 9. The mechanism for reciprocating this rail 77 has been described.

*The Static Frame Work Carrier Advancing Mechanism (Load)*

Referring now to FIGURES 8 and 9, it will be noted that cross members 78 are mounted across the static frame and partially overlie the treatment tanks 20, 21 having mounted thereon upstanding straps 79 secured to and holding in position a work carrying rail 80. The rail 77 is mounted for sliding movement beside the rail 80. The rail 77 is reciprocated, as best seen in FIGURE 11, wherein a fluid cylinder 81 drives a ram 82 connected by a cross head 83 to a rod 84 mounted on the static frame for reciprocation; thence through a cross head or drive arm 85 to the rail 77 whereby upon application of fluid to ram 82 through the connected entrainment the rail 77 is reciprocated.

Referring now to FIGURES 1 and 9, it will be noted that work carrying rails 86 and 87 are carried by the elevator. These rails are reciprocable and it will be noted that the rails 86 and 87 are shiftable in a vertical sense with respect to each other. Straps 88 carried by rail 87 form guideways for a guide 89 carried by rail 86 to permit one rail to be elevated slightly above the other when the elevator is in the down position. One of these rails is reciprocated forwardly to advance the work from one station to another and upon lowering of the elevator to the fully down position the other work rail rises above the transfer rail to support the work while the transfer rail is then reciprocated back to a position where upon elevation of the elevator this rail will engage beneath the work hanger on a subsequent reciprocation of that rail to advance the work while the elevator is in the up position.

A work carrying advance device is provided as best seen in FIGURE 1 in which a rod 90 is mounted for reciprocating motion and carries therewith a pusher member 91 for seating behind a work hanger 28 and upon reciprocation thereof to advance that work carrying hanger 28 onto a subsequent station.

*The Unload Elevator Frame Mechanism*

Referring now to FIGURE 10 it will be noted that the elevator frame 23 carries a reciprocable rail 92 to which is transferred work hangers 28 carrying treated work that has completed the cycle of the machine and which is to be placed on the monorail and taken from the machine. Note also FIGURE 2 in which a work carrier 28 has been advanced to a position whereby upon raising of the elevator the rail 92 will carry with the elevator a work hanger and work rack to be transferred onto the monorail.

*In Operation*

Referring now to a cycle of operation wherein the monorail 24 and its hooks 27 are carrying work hangers 28 to which are appended racks containing work to be treated, the rotary member 30 at the top of the mast 22 has been driven through the square shaft 52 to a position where one of the work transfer arms 36, a first work carrier pick-up means, is placed in substantial alignment with a monorail work carrier hook member 27. Due to the 90° displacement of these work transfer arms the other work transfer arm is at the same time in alignment to receive when engaged a second work pick-up hanger 28 carried on the discharge rail 92 (see FIGURE 2) of the elevator.

Upon driving the ram 64 upwardly the elevator structure 23 is raised to the position of FIGURE 1. As the elevator approaches the up position the plate 58 engages the rollers 45 carried on ring 44 causing the arm 39 through its pivotal connection 40 with the work transfer arms 36 to raise the work transfer arms 36 so that the work hanger engaging hooks 38ᵃ engage beneath the lips 28ᵇ of a work hanger to lift the hanger 28 from contact with the upturned end 27ᵃ of hangers 27 of the monorail feed. Simultaneously the other transfer arm 36 at right angles to the one shown in FIGURE 3 is engaging the work hanger 28 carried on the rail 92. When the elevator is in the fully up position the two work hangers 28 are lifted clear of the elevator rail 92 and monorail hook 27 and are actually being supported thereabove through the rollers 45 riding on the plate 58 carried by the elevator frame 23. When this attitude has been achieved the square shaft 52 rotates the transfer means including chain 56 driven through sprockets 54 and 55 to compel 90° rotation of the upper portion of the mast 22 and to move the work from the position of FIGURE 6 to the position of FIGURE 7 whereby a work hanger 28 carrying untreated work has been transferred from the monorail 24 to the intake of the machine through elevator 23 and a work hanger 28 carrying treated work is simultaneously transferred to the thus vacated hook 27 of the monorail feed 24 whereby the monorail passing from the machine will be carrying treated work, while the monorail up to this point will be carrying untreated work to be processed.

The upper portion of the mast 22 as shown in FIGURES 4 through 7 has two rotary positions. The elevator 23 has its up and down movements synchronized with the rotation of the upper end 30 of the mast 22 whereby transfer can be effected and rotation of the upper portion of the mast 22 can be effected only when the elevator 23 is in the up position.

Although we have disclosed herein the best form of the invention known to us at this time, we reserve the right to all such modifications and changes as may come within the scope of the following claims.

What is claimed is:

1. For use with an elevator operated article treating machine having a work carrier rail with intake and discharge stations and conveying elevating means for advancing work carriers through various treatment stations, the work carriers of which carry articles to be treated, which carriers are fed to the machine by a feed rail running substantially normal to the line of movement of the work carriers at the intake and discharge stations of the machine; a load-unload mechanism comprising a rotary transfer member mounted to rotate about a vertical axis, a first work carrier pick-up means pivotally carried by said rotary transfer member and positioned to come into registry with work carriers on the feed rail, a second work carrier pick-up means pivotally carried by said rotary transfer member and positioned to come into registry with work carriers at the discharge station of the work carrier rail on the machine, said first and second work carrier pick-up means being normally biased to a position out of engagement with work carriers and being pivoted to said rotary transfer member substantially normal to the axis of rotation of said rotary transfer member, lift actuating means connected to said first and second pick-up means and positioned to be engaged by the elevator upon raising of same thereby lifting said pick-up means to remove a work carrier from the feed rail and one from the discharge station of the work carrier rail, and transfer means connected to said pick-up means to move said work carrier from the feed rail to a position above a vacant receiver at the intake end on the work carrier rail of the machine and simultaneously place the work carrier from the discharge end of the work carrier rail of the machine above the thus vacated position on the feed rail, whereby upon lowering of the machine elevator the transfer is completed.

2. A load-unload mechanism as claimed in claim 1 further comprising a lift means connected between said pick-up means and said lift actuating means.

3. A load-unload mechanism as claimed in claim 1 further comprising a variable stop means for said lift means to regulate the lower limit of said pick-up means.

4. A load-unload mechanism as claimed in claim 1 wherein said first and second pick-up means have upturned work carrier engaging means.

5. A load-unload mechanism as claimed in claim 1 wherein said first and second pick-up means are displaced at an angle of the order of 90 degrees.

6. A load-unload mechanism as claimed in claim 1 wherein said lift actuating means is connected to said pick-up means by a pivoted knee joint having a roller at the knee, a long leg connected between the pick-up means and the knee joint, a short leg connected between the knee joint and said lift actuating means, said lift actuating means having roller projections positioned to be engaged by the machine elevator.

7. A load-unload mechanism as claimed in claim 1 wherein said transfer means is a rotary means to which one end of each pick-up means is secured.

8. For use with an elevator operated machine, a load-unload mechanism comprising a rotary transfer member, a plurality of work carrier pick-up arms pivotally mounted on and connected to rotate with said rotary transfer means and being pivoted to move freely in a plane substantially normal to the plane of rotation of said rotary transfer member, work carrier pick-up lift means carried by each of said work carrier pick-up arms positioned to be engaged by a portion of the machine elevator upon elevation thereof to lift a work carrier from the feed rail and from the work carrier rail at the discharge side of the machine, and rotary means for rotating the transfer member to rotate the work carrier from the feed rail to a vacant position above the work carrier rail at the intake end of the machine and to simultaneously transfer a work carrier from the discharge end of the machine to a vacant station above the feed rail whereby upon lowering of the machine elevator the respective work carriers are transferred.

9. A load-unload mechanism as claimed in claim 8 wherein there are two work carrier pick-up means spaced 90 degrees apart about said rotary transfer means.

10. A load-unload mechanism as claimed in claim 8 wherein said work carrier pick-up means have upturned hooks at their free ends to engage downturned lips on the work carriers.

11. For use with an article treating machine having an elevator and a work carrier rail for receiving work carriers from a feed rail located at an angle to the work carrier rail of the machine, a load-unload mechanism comprising pick-up means positioned to engage a work carrier on a feed rail, transfer means connected to said pick-up means for lifting and moving the work carrier from the feed rail to a position above the work carrier rail of the machine, and elevator means operatively associated with the transfer means and pick-up means for lowering the work carrier upon the work carrier rail of the machine.

12. A load-unload mechanism as claimed in claim 11 wherein there are a plurality of pick-up means spaced circumferentially at predetermined distances.

13. A load-unload mechanism as claimed in claim 12 wherein said pick-up means are pivoted at their upper ends and have arms pivoted thereto and positioned to be engaged by an element of the machine upon raising of the machine element to raise the pick-up means about its pivot to lift the work carrier from the feed rail.

14. For use with an article treating machine having an elevator upon which is carried a work carrier rail for receiving work carriers from a feed rail located at an angle to the work carrier rail of the machine, a load-unload mechanism comprising a rotary transfer member, work carrier pick-up means pivotally connected to the rotary transfer means, pick-up means actuating means carried by said pick-up means positioned to be actuated upon being contacted by the elevator of the machine, for lifting a work carrier from the feed rail, and means connected to rotate said transfer member to place the work carrier upon the work carrier rail of the machine.

15. For use with an elevator operated machine, a load-unload mechanism comprising a rotary transfer member, a plurality of work carrier pick-up arms pivotally mounted on and connected to rotate with said rotary transfer means and being pivoted to move freely in a plane substantially normal to the plane of rotation of said rotary transfer member, work carrier pick-up lift means carried by each of said work carrier pick-up arms positioned to be engaged by a portion of the machine elevator upon elevation thereof to lift a work carrier from the feed rail and from the work carrier rail at the discharge side of the machine, rotary means for rotating the transfer member to rotate the work carrier from the feed rail to a vacant position above the work carrier rail at the intake end of the machine and to simultaneously transfer a work carrier from the discharge end of the machine to a vacant station above the feed rail whereby upon lowering of the machine elevator the respective work carriers are transferred, and wherein said work carrier pick-up lift means is a linkage comprising an upper lever the upper end of which is connected to the pick-up means, a lower lever the upper end of which is pivoted to the lower end of the upper lever, a balance ring connected to the lower end of the lower lever, and roller means carried by said balance ring positioned to be engaged and elevated by a portion of the machine elevator upon raising thereof causing said pick-up means to be elevated.

References Cited in the file of this patent

UNITED STATES PATENTS

| | | |
|---|---|---|
| 2,771,175 | Da Costa | Nov. 20, 1956 |
| 2,792,953 | King | May 21, 1957 |
| 2,919,010 | Hautau | Dec. 29, 1959 |

OTHER REFERENCES

German printed application, V4267, June 7, 1956.